United States Patent [19]
Patil et al.

[11] Patent Number: 6,156,872
[45] Date of Patent: Dec. 5, 2000

[54] PARAFFIN-SOLUBLE POLYMERS AND COPOLYMERS

[75] Inventors: Abhimanyu O. Patil, Westfield; Donald N. Schulz, Annandale; Raymond A. Cook, Hampton; Michael G. Matturro, Lambertville, all of N.J.

[73] Assignee: Exxon Research and Engineering Co., Florham Park, N.J.

[21] Appl. No.: 09/233,362

[22] Filed: Jan. 19, 1999

[51] Int. Cl.[7] ........................... C08G 67/02; C08G 61/00; C08F 238/02

[52] U.S. Cl. ........................ 528/392; 528/396; 528/491; 528/502 C; 528/503; 525/202; 525/220; 525/236; 525/273; 525/328.1; 525/539

[58] Field of Search ..................................... 528/392, 396, 528/491, 502 C, 503; 525/202, 220, 236, 273, 328.1, 539

[56] References Cited

U.S. PATENT DOCUMENTS

| | | | |
|---|---|---|---|
| 4,024,326 | 5/1977 | Hudgin | 526/11.1 |
| 5,057,599 | 10/1991 | Wong | 528/392 |
| 5,102,844 | 4/1992 | Wong | 502/162 |
| 5,719,258 | 2/1998 | Drent | 528/392 |

FOREIGN PATENT DOCUMENTS

| | | |
|---|---|---|
| WO 96/22266 | 7/1996 | WIPO . |

*Primary Examiner*—Duc Truong
*Attorney, Agent, or Firm*—Gerard J. Hughes; Kenneth W. Peist

[57] ABSTRACT

The invention is related to non-linear, paraffin-soluble olefin/carbon monoxide and olefin/acetylene/carbon monoxide copolymers. The invention is also related to a method for preparing olefin/carbon monoxide copolymers by heating a feed of at least one olefin, carbon monoxide, carbon dioxide, hydrogen, and methane in the presence of a free radical polymerization initiator. More particularly, the feed comprises at least one olefin, the total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include acetylene in an amount ranging up to about mole %.

19 Claims, No Drawings

PARAFFIN-SOLUBLE POLYMERS AND COPOLYMERS

FIELD OF THE INVENTION

The invention is directed towards paraffin-soluble polymers and copolymers formed from a dilute, multicomponent monomer source having ethylene, carbon monoxide, and other reactive and inert components.

BACKGROUND OF THE INVENTION

Ethylene-carbon monoxide copolymers, designated "E/CO" or "[ethylene co-CO]" herein, are generally made from pure ethylene and CO feeds using either free radical initiators or organometallic catalysts. The free radical products are useful as PVC modifiers or degradable films. The organometallic catalyzed products are linear alternating polymers that are useful as engineering resins. Undesirably, though, such polymers prepared according to either method have low solubility in paraffins.

Copolymers of acetylene, olefin, and carbon monoxide, designated "acetylene/olefin/CO" or "[acetylene co-olefin co-CO]" herein, are known in the art, and have beneficial crosslinking and curing sites. However, such copolymers are linear copolymers, and consequently have low solubility in paraffin.

There is therefore a need for paraffin-soluble E/CO copolymers and for non-linear acetylene/olefin/CO copolymers.

SUMMARY OF INVENTION

In one embodiment, the invention is a paraffin-soluble olefin-carbon monoxide copolymer.

In another embodiment, the invention is a method for preparing olefin/carbon monoxide copolymers by heating a feed of at least one olefin, carbon monoxide, carbon dioxide, hydrogen, and methane under free radical polymerization conditions and in the presence of a free radical polymerization initiator. More particularly, the feed comprises at least one olefin, the total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include acetylene in an amount ranging up to about 10 mole %.

In another embodiment, the invention is the product formed by heating a feed of at least one olefin, carbon monoxide, carbon dioxide, hydrogen, and methane under free radical polymerization conditions and in the presence of a free radical polymerization initiator. More particularly, the feed comprises at least one olefin, the total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include acetylene in an amount ranging up to about 10 mole %.

In still another embodiment, the invention is a non-linear, paraffin-soluble olefin/acetylene/carbon monoxide copolymer.

DETAILED DESCRIPTION OF THE INVENTION

The invention is based on the discovery that [olefin co-CO] polymerization processes using multicomponent feeds result in paraffin-soluble copolymers having a total number of branches per 1000 carbon atoms ranging from about 60 to about 300. Multicomponent feeds such as syngas-type feeds contain at least one olefin, carbon monoxide, hydrogen, carbon dioxide, methane and optionally acetylene are derived from various hydrocarbon conversion processes, such as partial oxidation and cracking, and are becoming increasingly abundant. Surprisingly, such feeds are useful for forming carbon monoxide-containing polymers even though the feeds contain dilute monomer concentrations and substantial amounts of other reactive components, such as hydrogen or acetylene. Moreover, it is believed that hydrogen present in such feeds beneficially acts as a mild chain transfer agent.

Feeds useful in the practice of the invention comprise at least one olefinically unsaturated compound, such as ethylene, with a total amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include at least one acetylenically unsaturated compound, such as acetylene, in an amount ranging up to about 10 mole %.

The olefinically unsaturated compounds (i.e., olefins) useful in the invention typically contain up to 20 carbon atoms, preferably up to 10 carbon atoms. They may contain heteroatoms; however, it is preferred that the olefinically unsaturated compounds are hydrocarbons. A preferred class of olefinically unsaturated hydrocarbons are aliphatic monoolefins, in particular $\alpha$-olefins of which ethylene is particularly preferred.

The acetylenically unsaturated compounds useful in this invention preferably contain up to 20 carbon atoms, more preferably up to 10 carbon atoms. Preferably they are hydrocarbyl compounds, and they may vary widely in structure. They may also contain heroatoms. Preferably, the acetylenically unsaturated compounds have at most one organic group attached to the ethynyl groups. More preferably the acetylenically unsaturated compound is of the general formula R—C≡Ch where R denotes a hydrogen atom or a hydrocarbyl group. Hydrocarbyl groups R may be aryl groups, such as phenyl, 4-methoxyphenyl, 3-chlorophenyl and naphthyl groups, or (cyclo)alkyl groups, such as methyl, ethyl, 2-propyl, 2-butyl, cyclohexyl and 2-methylhexyl-1 groups. For example, when the R group is a methyl group then the acetylenically unsaturated compound is propyne and when the R group is hydrogen then the acetylenically unsaturated compound is acetylene. A mixture of acetylenically unsaturated compounds may be involved, but a single acetylenically unsaturated compound is preferred.

Feeds used in the practice of the invention contain a combined CO and olefin concentration of no more than about 35 mole %. The preferred olefin is ethylene. The preferred feed is derived from hydrocarbon, preferably from gas conversion processes, and still more preferably from natural gas conversion processes. Oxidative coupling and methane partial oxidation of methane-containing gas followed by ethane quench are examples of such a reaction. The methane-containing gas may be a natural gas or a synthetic gas. Mixtures of feeds resulting from such processes are also within the scope of the invention. In addition to carbon dioxide, inert diluents such as methane can be present in the feed in amounts ranging from about 4 mole % to about 85 mole %. Importantly, feeds used in the practice of the invention may contain up to about 55 mole % $H_2$. The preferred feed contains about 5 to about 55 mole % hydrogen, and is formed in a methane-derived hydrocarbon synthesis reaction.

CO-containing polymers of the present invention are formed in free radical polymerization processes using organic peroxides as a free radical initiator according to conventional methods. Representative initiators include dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate e half life at reaction temperatures ranging from about 50° C. to about 200° C. can be used, and of these, t-butyl peroxypivalate, which has a half life of about 10 hours at 66° C., is preferred.

Such feeds and initiators are useful for forming CO-containing polymers under copolymerization conditions at temperatures ranging from about 50 to about 230° C., preferably from about 50° C. to about 100° C., pressures ranging from about 100 to about 30,000 psig, preferably from about 100 psig to about 3,000 psig, and in the presence of a free radical initiator having an appropriate half life.

The term "copolymer" is used herein according to its broad meaning of a macromolecule formed from two or more monomer sources. The term "polymer" is used herein according to its broad meaning of a macromolecule formed from at least one monomer source.

Preferably, the reaction occurs in the presence of a solvent. Suitable solvents include toluene, benzene, dioxane, pentane, heptane, hexane, propylene oxide, cyclohexane, and the like. Hexane is preferred.

The polymers and copolymers prepared in accord with this invention may be recovered from the polymerization of mixture using conventional methods, for example, by filtration or by evaporation of the diluent. They may be brought into the desired shape by the usual forming techniques, such as cold or hot pressing. Alternatively, the polymerization is carried out in such a way that the copolymer is formed in the desired shape, such as by solution polymerization in a thin layer and subsequent removal of the diluent, which yields the copolymer in the form of a film.

The number average molecular weight ("Mn") of the polymers formed in accordance with the invention range from about 100 to about 1,000,000. Mn preferably ranges from 200 to 100,000 and more preferably from 500 to 50,000.

The degree of branchiness of the copolymer chains and the number of monomer units originating in the monomers with polymerizable carbon—carbon unsaturation relative to the number of carbon atoms originating in carbon monoxide will both, at least in part, determine the regularity of the polymer chains and thereby also some of the properties of the copolymer, for example the crystallinity and solubility. The ratio of the number of monomer units originating in the olefinically unsaturated compound to the number of carbon atoms originating in carbon monoxide is preferably at most about 99:1, more preferably in the range of from about 90:1 to about 1:1, and still more preferably from about 95:1 to about 1:1. However, where the presence of additional cure sites on the resulting polymer or copolymer are desired or beneficial, the preferred range of acetylene incorporation should be less than 10 mole %.

The polymers prepared according to the practice of the invention are non-linear polymers having a total number of branches per 1000 carbon atoms ranging from about 60 to about 300. Branchiness is measured by $^{13}C$ solution NMR in deutero chloroform using a $Cr(AcAc)_3$ relaxation agent. The number of $C_1$ branches per 1000 carbon atoms was measured at about 20.1 ppm; the number of $C_2$ branches per 1000 carbon atoms was measured at about 11.3 ppm; the number of $C_3$ was measured at about 14.7 ppm; and the number of $C_4$ branches was measured at about 14.2 ppm.

The polymers prepared in accord with this invention are paraffin-soluble. The term "paraffin" as used herein is a normal, iso, or straight chain alkane.

The invention is further described in the following non-limiting examples.

EXAMPLES 1–3

Carbon monoxide-containing polymers using pure ethylene and carbon monoxide feeds were synthesized using free-radical polymerization techniques as follows:

A 300 ml autoclave reactor was charged with a solvent (n-hexane) and a t-butyl peroxypivalate initiator. The reactor was sealed and purged with purified nitrogen. The reactor was pressurized to 700 psig with a CP grade ethylene-carbon monoxide feed. The temperature was raised to 66° C. while stirring, and was maintained for 24 hours. The reactor was allowed to cool to room temperature, and was then depressurized. The hexane was removed on rotary evaporator to obtain the product.

Table-1 sets forth polymerization details.

TABLE 1

| Example Number | E:CO feed | Solvent Hexane (ml) | Temp (° C.) | Initiator t-butyl peroxypivalate (g) | Yield (g) | Comments |
| --- | --- | --- | --- | --- | --- | --- |
| 1 | 50:50 | 125 | 66 | 0.612 | 10.62 | Hexane Insoluble |
| 2 | 90:10 | 50:50 | 66 | 0.628 | 12.25 | Hexane Insoluble |
| 3 | 95:05 | 150 | 66 | 0.619 | 10.15 | Hexane Insoluble |

The products of examples 1, 2, and 3 were analyzed by IR, NMR, and Gel Permeation Chromatography (GPC). The polymer product formed in Example 2 has 3 $C_1$ branches, 20 $C_2$ branches, 1 $C_3$ branch, and 15 branches of $C_4$ or greater per 1000 carbon atoms, or about 39 total branches per 1000 carbon atoms. Table-2 sets forth other characterization results for the three polymer products.

TABLE 2

| Example Number | NMR mole % Composition | GPC (Mn) | GPC (Mw) | I.R. C = O (cm$^{-1}$) |
| --- | --- | --- | --- | --- |
| 1 | E: 58.5; CO: 41.5 | 230 | 330 | 1707 |
| 2 | B: 69.0; CO: 31.0 | 1500 | 2300 | 1708 |
| 3 | E: 79.6; CO: 20.4 | 2300 | 3400 | 1713 |

The products were analyzed by IR, NMR, and Gel Permeation Chromatography (GPC). GPC was performed in trichlorobenzene at 135° C. using polyethylene standards, as these copolymers were insoluble in THF at room temperature.

EXAMPLE 4

Carbon monoxide containing polymer using a dilute multicomponent syngas "MCS" feed was synthesized according to free-radical polymerization techniques as follows:

A 300 ml autoclave reactor was charged with 150 ml pure n-hexane and 0.611 grams of a 75% solution of t-butyl peroxypivalate in mineral spirits. (t-Butyl peroxypivalate has a 10 hour half-life at 55° C. in a 0.2 M benzene solution) (Swern, "Organic Peroxides", John Wiley and Sons, 1970, Vol. 1, pp 82, 87). The reactor was sealed and purged with purified nitrogen. The reactor was then pressurized with the MCS mixture (acetylene 8.3 mole %, ethylene 9.5 mole %, carbon monoxide 21.3 mole %, carbon dioxide 3.29 mole %, methane 4 mole %, and hydrogen 53.65 mole %) to 200 psig. The temperature was raised to 66° C. while stirring and the pressure was maintained for 24 hours. The reactor was allowed to cool to room temperature and was then depressurized. The hexane was removed on rotary evaporator leaving 1.5 grams of the product.

The product was characterized by IR, NMR and GPC. The FTIR spectrum of the product showed a very strong peak at 1715 cm$^{-1}$ due to carbonyl group. Thus, CO has been incorporated in the product. It also showed a broad shoulder at 1630 cm$^{-1}$ in the IR and proton resonances at about 4.6 to about 6 ppm resulting from acetylene monomer incorporation. The $^{13}$C NMR of the product indicated that polymer had 20% CO incorporation and a non-linear (branched) polyethylene structure. The GPC of the product indicated a Mw of 680 (polystyrene standards, THF solvent). The product was soluble in hexane, and its non-linear character is indicated by the presence of a broad multiplet in the $^{13}$C NMR for the aliphatic region at about 9 to about 48 ppm and a multiplet at about 206 to about 218 ppm for the CO resonance. The number of branches per 1000 carbon atoms range as follows: $C_1$=31; $C_2$=88; $C_3$=14; and $C_4$ or larger =69, for a total number of branches per 1000 carbon atoms of about 202.

EXAMPLE 5

Carbon monoxide containing polymer using an MCS feed was synthesized according to free-radical polymerization techniques as follows:

A 300 ml autoclave reactor was charged with 150 ml pure n-hexane and 0.174 grams of a 75% solution of t-butyl peroxypivalate in mineral spirits. The reactor was sealed and purged with purified nitrogen. The reactor was then pressurized with an MCS mixture (Ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane was removed on rotary evaporator to obtain the product. It should be noted that the feed contained a high diluent concentration and no acetylene.

The product was characterized by IR, NMR and GPC. The FTIR spectrum of the product showed a very strong peak at 1715 cm$^{-1}$ due to carbonyl group, indicating incorporation of carbon monoxide in the product. In this product the IR showed a much sharper carbonyl peak compared to that in Example 4. It is believed that the sharper peak results from the absence of the double bond peak that is attributed to acetylene incorporation in the product of example 4. The product was soluble in hexane. The $^{13}$C NMR of the product indicated that the polymer had 5.1% CO incorporation and a non-linear (branched) polyethylene structure, as indicated by a broad multiplet in the $^{13}$C NMR for the alkyl region at 9–48 ppm and a multiplet at 206–218 for the CO resonance. The GPC of the product indicated a Mn of 320 and a Mw of 420.

These examples show that paraffin-soluble CO-containing polymer products can be formed from multicomponent feeds. The examples also show the formation of acetylene/olefin/CO polymer products.

What is claimed is:

1. A composition comprising a non-linear, paraffin-soluble copolymer.

2. The composition of claim 1 wherein the copolymer's number average molecular weight ranges from about 200 to about 1,000.

3. The composition of claim 2 wherein CO incorporation in the copolymer ranges from about 2 to about 50 mole %.

4. The composition of claim 3 wherein the copolymer has a total number of branches per 1000 carbon atoms ranging from about 80 to about 300.

5. The composition of claim 4 wherein the olefin is ethylene.

6. The composition of claim 5 wherein the copolymer further comprises acetylenically unsaturated monomer units.

7. The copolymer of claim 6 wherein the acetylenically unsaturated unit has the formula —HC≡CH—.

8. Method comprising reacting a feed under free radical copolymerization conditions, the feed comprising olefin in an amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %.

9. The method of claim 8 wherein the copolymerization conditions range in temperature from about 50 to about 230° C., range in pressure from about 100 to about 30,000 psi, and include a free radical initiator having a appropriate half life.

10. The method of claim 9 wherein the feed further comprises acetylene in an amount ranging up to about 10 mole %.

11. The method of claim 10 wherein the copolymerization is conducted in the presence of a solvent selected from the group consisting of toluene, benzene, dioxane, pentane, heptane, hexane, propylene oxide, cyclohexane, and mixtures thereof.

12. The method of claim 11 wherein the free radical initiator selected from the group consisting of ditertiary-butyl peroxide, 2,5-dimethyl-2,5-ditertiary-butyl-peroxyhexane, di-cumyl peroxide; teriary-butyl hydroperoxide, tertiary-octyl hydroperoxide, cumene hydroperoxide; benzoyl peroxide; tertiary-butyl peroxypivalate, tertiary-butyl-perbenzoate; azo-bis-isobutyronitrile, and mixtures thereof.

13. The method of claim 12 wherein the feed is derived from a hydrocarbon conversion process.

14. A polymer formed by reacting a feed under copolymerization conditions in the presence of a free radical polymerization initiator wherein the feed contains carbon monoxide in an amount ranging from about 1 to about 40 mole %, hydrogen in an amount ranging from about 4 to about 55 mole %, carbon dioxide in an amount ranging from about 3 to about 10 mole %, methane in an amount ranging from about 4 to about 85 mole %, and at least one olefin, the total olefin amount ranging from about 5 to about 40 mole %.

15. The product of claim 14 wherein the copolymerization conditions range in temperature from about 50 to about 230° C., range in pressure from about 100 to about 30,000 psig, and wherein the radical initiator has an appropriate half life.

16. The product of claim 15 wherein the feed further comprises acetylene in an amount ranging up to about 10 mole %.

17. The product of claim 16 wherein the copolymerization is conducted in the presence of a solvent selected from the group consisting of toluene, benzene, dioxane, pentane, heptane, hexane, propylene oxide, cyclohexane, and mixtures thereof.

18. The product of claim 17 wherein the free radical initiator is selected from the group consisting of ditertiary-butyl peroxide, 2,5-dimethyl-2,5-ditertiary-butyl-perpxyhexane, di-cumyl peroxide; tertiary-butyl hydroperoxide, tertiary-octyl hydroperoxide, cumene hydroperoxide; benzoyl peroxide; tertiary-butyl peroxypivalate, tertiary-butyl-perbenzoate; azo-bis-isobutyronitrile, and mixtures thereof.

19. The product of claim 18 wherein the feed is derived from a hydrocarbon conversion process.

* * * * *

UNITED STATES PATENT AND TRADEMARK OFFICE
CERTIFICATE OF CORRECTION

PATENT NO. : 6,156,872
DATED : December 5, 2000
INVENTOR(S) : Abhimanyu O. Patil, et. al.

It is certified that error appears in the above-identified patent and that said Letters Patent is hereby corrected as shown below:

Column 6,
Line 7, of claim 1, "soluble copolymer" should read -- soluble olefin/co copolymer.--

Signed and Sealed this

Sixteenth Day of October, 2001

Attest:

NICHOLAS P. GODICI
Attesting Officer
Acting Director of the United States Patent and Trademark Office